(No Model.)

F. P. BURNHAM & J. D. ALSUP.
CRANK HANGER FOR BICYCLES.

No. 589,496. Patented Sept. 7, 1897.

Witnesses.

Inventors.
Franklin P. Burnham
Jefferson D. Alsup

UNITED STATES PATENT OFFICE.

FRANKLIN P. BURNHAM AND JEFFERSON D. ALSUP, OF CHICAGO, ILLINOIS.

CRANK-HANGER FOR BICYCLES.

SPECIFICATION forming part of Letters Patent No. 589,496, dated September 7, 1897.

Application filed December 13, 1895. Serial No. 572,007. (No model.)

*To all whom it may concern:*

Be it known that we, FRANKLIN P. BURNHAM and JEFFERSON D. ALSUP, citizens of the United States, residing at Chicago, in the county of Cook and State of Illinois, have invented certain Improvements in Crank-Hangers for Bicycles, of which the following is a specification.

Our invention relates to bicycles and has for its object to produce an improved crank-hanger which allows the maximum distance between the bearings with minimum of tread in any given machine.

Our invention is illustrated in the accompanying drawings, wherein—

Figure 1:
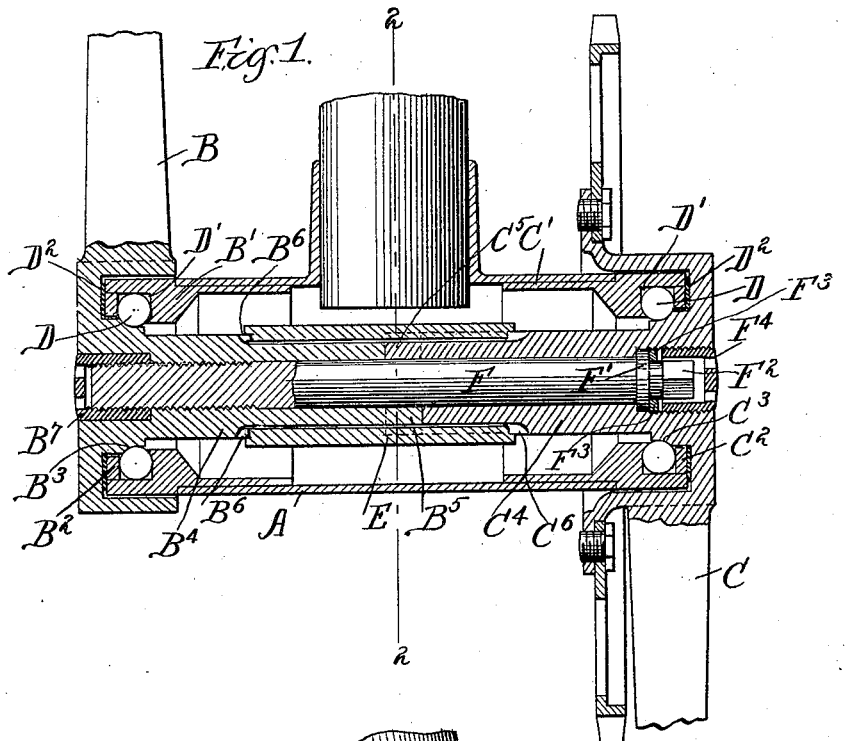
Figure 2:
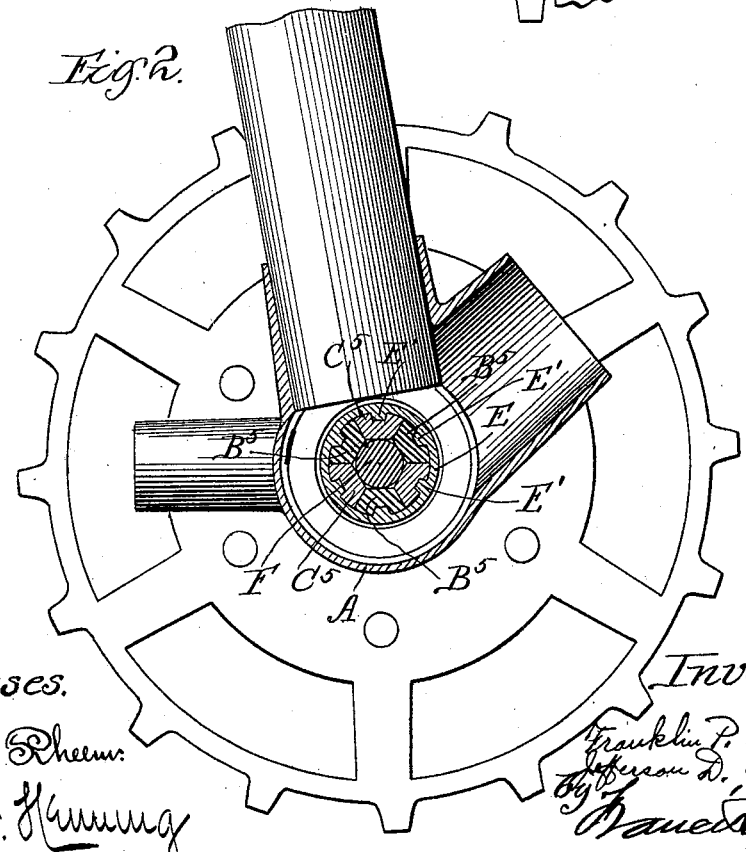

Figure 1 is a longitudinal section through the hanger. Fig. 2 is a cross-section on line 2 2, Fig. 1.

Like letters refer to like parts throughout the figures.

The crank-shaft sleeve A is preferably similar to the crank-shaft sleeve in an ordinary bicycle. The cranks B and C are provided with hollow hubs. The ends of the crank-shaft sleeve are provided with the short sleeves or tubes $B'$ and $C'$, which carry the balls D. These balls are contained in a groove $D'$, the said groove being of such shape as to normally prevent them from being removed therefrom when the washers $B^2$ and $C^2$ are in position. The tubes $B'$ $C'$ project into the hollow hubs, as shown, and said hubs are provided with the bearing-surfaces $B^3$ $C^3$ for the balls. The crank-hubs are provided with the inwardly-projecting parts or arms $B^4$ $C^4$. These arms are provided at their inner ends with teeth $B^5$ $C^5$, which interlock, so as to connect the two cranks together. These projecting arms are also provided with grooves $B^6$ $C^6$. A sleeve E surrounds these inwardly-projecting arms and is provided with ribs or projections $E'$, adapted to enter the grooves in the arms, so as to rigidly connect said arms together. A washer $D^2$ is interposed between each hub and the tubes $B'$ $C'$. A threaded rod or bolt F passes through the hollow hubs and the projecting arms thereon. Said bolt is provided with a collar $F'$, adapted to engage the hub of crank C, as shown, and is provided with a head $F^2$, which is contained within a hole in said hub when the bolt is in position. A screw-threaded washer $F^3$ is adapted to be inserted in the opening in the hub of crank C, so as to hold said bolt in position. By this construction said bolt may be rotated, but will be held in place in the hub. A threaded cap $F^4$ is adapted to be inserted in the hole in the hub and prevents dirt from entering therein. The projecting arm $B^4$ on the hub of crank B is screw-threaded near its outer end, as shown, and the bolt F passes through its screw-threaded portion. The hub of crank B is also provided with an enlarged opening, the bolt F extending partly through such enlarged opening, as shown. An internally-screw-threaded cap $B^7$ is screwed upon the end of said bolt and completely covers the opening in the hub of the crank, so as to prevent dirt from entering therein. The sprocket-wheel is connected with one of the crank-hubs, as shown.

It will be seen that we have here what may be called a "divided" crank-shaft and that our adjusting device may be used upon bicycles which do not have the hollow hubs, and, in fact, may be used upon bicycles of any and all descriptions.

We have described these several parts in detail; but it is evident that they may be varied in form and construction without departing from the spirit of our invention, and we therefore do not wish to be limited to the exact construction shown.

The use and operation of our invention are as follows:

When it is desired to put the parts together, the sleeve E is driven upon the arm $B^4$, the ribs or projections on the sleeve entering the grooves in said arm. After the tubes $B'$ $C'$ are in position in the end of the crank-shaft sleeve the arms $B^4$ and $C^4$ are inserted in said sleeve, the bolt F being first placed in position in the sleeve $C^4$. When the arms have been moved toward each other until the bolt reaches the screw-threaded portion of the opening in the arm $B^4$, the bolt F is turned by means of a wrench, which fits upon the head $F^2$, until the parts are brought into the required relative position. As the two parts are forced together the ribs or projections on the sleeve E enter the grooves in the arm $C^4$, and when the parts are in position the teeth on the ends of the two arms are in engagement. The caps $F^4$ and $B^7$ are then inserted in the openings in the hubs of the cranks.

It will be seen that the parts are now protected from dust and dirt and are so constructed that they may be easily put together or taken apart. The bolt passing through the hubs of the crank is threaded in such a manner that there will be no tendency to loosen the cap on the end thereof or the bolt itself by the revolution of the cranks.

We have described the bolt or rod F as having a screw-threaded engagement with one part of the divided crank-shaft; but by this we mean any equivalent engagement between these parts whereby a relative rotary movement produces a relative longitudinal movement.

We claim—

1. A crank-hanger for bicycles comprising a sleeve provided at each end with short tubes, containing a series of balls, cranks provided with hollow hubs into which said tubes project and provided with bearing-surfaces for said balls, said hubs provided with inwardly-projecting parts having interlocking parts on their ends adapted to be brought into engagement, a bolt passing through said inwardly-projecting parts and provided with screw-threads adapted to engage the threaded portion of one of said inwardly-projecting parts so as to hold them together, said bolt connected with one of said hubs so as to be free to rotate therein but having no longitudinal motion in either direction with relation thereto.

2. A crank-hanger for bicycles comprising cranks provided with hollow hubs having inwardly-projecting parts connected therewith, a sleeve into which said inwardly-projecting parts fit, said sleeve provided at each end with short tubes carrying a series of balls, said hollow hubs being provided with bearing-surfaces for said balls, a second sleeve surrounding said inwardly-projecting portions of the hub and adapted to engage them so as to bind them together, a bolt passing through said hubs and inwardly-projecting portions and provided with a head countersunk in one of said hubs, a washer or the like inserted in a countersunk portion of said hub and adapted to hold said bolt in position at the same time allowing it to have a rotary motion, a screw-threaded part on the inwardly-projecting part of the other hub adapted to be engaged by said bolt, a cap adapted to be inserted in said latter hub and engaging the end of said bolt, and a second cap adapted to be inserted in a countersunk portion of the first hub so as to cover the head of the bolt substantially as described.

3. A crank-shaft for bicycles comprising cranks with hollow hubs, having inwardly-projecting parts thereon, an interlocking connection between said parts, a bolt passing through such inwardly-projecting parts, said bolt threaded at one end and engaging threads in the opening in one of said projecting parts, the other end of said bolt being provided with a head countersunk in one of said hubs, the opening containing said head being screw-threaded, and a washer having a screw-threaded periphery, the screw-threads thereon engaging the threaded opening containing the head of said bolt, said washer engaging a projection or collar on said bolt so as to prevent it from moving longitudinally with relation to the hub, but allowing it to be rotated about its axis.

4. A crank mechanism for bicycles comprising a divided crank-shaft having cranks connected therewith, a sleeve or hanger in which said shaft is mounted, a rod or bolt passing through said divided crank-shaft and provided at one end with screw-threads which engage screw-threads in an opening in one part of said shaft, a holding or securing device associated with the other part of said shaft and adapted to hold said rod or bolt so as to prevent it from being moved backward, but which allows it to be rotated about its axis.

FRANKLIN P. BURNHAM.
JEFFERSON D. ALSUP.

Witnesses:
DONALD M. CARTER,
FRANCIS M. IRELAND.